(12) United States Patent
Yang et al.

(10) Patent No.: US 11,235,763 B2
(45) Date of Patent: Feb. 1, 2022

(54) METHOD, APPARATUS, DEVICE AND READABLE STORAGE MEDIUM FOR PREVENTING VEHICLE COLLISION

(71) Applicant: BEIJING BAIDU NETCOM SCIENCE TECHNOLOGY CO., LTD., Beijing (CN)

(72) Inventors: Fan Yang, Beijing (CN); Fan Zhu, Beijing (CN); Weicheng Zhu, Beijing (CN); Leibing Lv, Beijing (CN); Lin Ma, Beijing (CN)

(*) Notice: Subject to any disclaimer, the term of this patent is extended or adjusted under 35 U.S.C. 154(b) by 103 days.

(21) Appl. No.: 16/704,043

(22) Filed: Dec. 5, 2019

(65) Prior Publication Data
US 2020/0180615 A1 Jun. 11, 2020

(30) Foreign Application Priority Data
Dec. 6, 2018 (CN) .......................... 201811485124.8

(51) Int. Cl.
*B60W 30/09* (2012.01)
*B60W 30/095* (2012.01)
*G08G 1/16* (2006.01)

(52) U.S. Cl.
CPC ........ *B60W 30/0956* (2013.01); *B60W 30/09* (2013.01); *B60W 30/0953* (2013.01);
(Continued)

(58) Field of Classification Search
CPC ............. B60W 30/09; B60W 30/0953; B60W 30/0956; B60W 2420/52; B60W 2420/62;
(Continued)

(56) References Cited

U.S. PATENT DOCUMENTS

| 2015/0019080 | A1* | 1/2015 | Schneider | ............... G01S 15/04 |
| | | | | 701/41 |
| 2018/0067496 | A1* | 3/2018 | Prasad | .................... G01S 17/86 |

(Continued)

FOREIGN PATENT DOCUMENTS

| CN | 104276172 A | 1/2015 |
| CN | 105216792 A | 1/2016 |

(Continued)

OTHER PUBLICATIONS

Chinese Office Action; Application No. CN 201811485124.8; dated Dec. 13, 2019; 6 pages.

*Primary Examiner* — Anshul Sood
(74) *Attorney, Agent, or Firm* — Dilworth IP, LLC (57) ABSTRACT

The present disclosure provides a method, an apparatus, a device and a readable storage medium for preventing a vehicle collision. The method includes determining a current conservative anti-collision region of a vehicle acquiring the omnidirectional environmental information in the current region in the current conservative anti-collision region; predicting a behavior of an obstacle according to the omnidirectional environmental information in the current region, and controlling the vehicle to conduct an anti-collision behavior according a prediction result, a reasonable prediction may be made to the behavior of the obstacle based on the conservative anti-collision region and the omnidirectional environmental information, thus controlling the vehicle to conduct an accurate anti-collision behavior, thereby preventing collisions effectively, and avoiding an occurrence of traffic accidents.

13 Claims, 5 Drawing Sheets

FIG. 2

(52) U.S. Cl.
CPC ......... *G08G 1/166* (2013.01); *B60W 2420/52* (2013.01); *B60W 2420/62* (2013.01); *B60W 2520/06* (2013.01); *B60W 2554/00* (2020.02)

(58) Field of Classification Search
CPC .......... B60W 2520/06; B60W 2554/00; G08G 1/166
See application file for complete search history.

(56) References Cited

U.S. PATENT DOCUMENTS

2019/0225266 A1\* 7/2019 Enomoto ................ G01S 13/86
2019/0331497 A1\* 10/2019 Vora ........................ G06F 16/29

FOREIGN PATENT DOCUMENTS

| | | |
|---|---|---|
| CN | 106184202 A | 12/2016 |
| WO | 2015056394 A2 | 4/2015 |

\* cited by examiner

METHOD, APPARATUS, DEVICE AND READABLE STORAGE MEDIUM FOR PREVENTING VEHICLE COLLISION

CROSS-REFERENCE TO RELATED APPLICATION

This application claims priority to Chinese Patent Application No. 201811485124.8, filed on Dec. 6, 2018, which is hereby incorporated by reference in its entirety.

TECHNICAL FIELD

The present disclosure relates to the field of unmanned driving technology and, in particular, to a method, an apparatus, a device and a readable storage medium for preventing a vehicle collision.

BACKGROUND

With the development of computer technologies and artificial intelligence, unmanned driving vehicles (for short, unmanned vehicle) have a widely application prospect in the aspects of transportation, military, logistic storage, daily life and so forth. The unmanned driving technologies mainly include perception of environmental information, intelligent decision-making of driving behaviors, planning of routes without collisions, motion controlling of vehicles and other parts.

Milliwave radars are applied in current unmanned vehicles for perceiving the environmental information, the detection regions of which are sector detection regions, the unmanned vehicles will make intelligent decisions about driving behaviors according to the acquired environmental information.

However, a sector detection region could not cover information of all obstacles around the unmanned vehicle comprehensively, when a moving obstacle which is not in the sector region suddenly appears therein, the unmanned vehicle could not prevent collisions effectively, thus leading to the occurrence of traffic accidents.

SUMMARY

Embodiments of the present disclosure provide a method, an apparatus, a device and a readable storage medium for preventing a collision, to prevent collisions effectively and avoid the occurrence of traffic accidents.

A first aspect of the present disclosure provides a method for preventing a vehicle collision, including:
  determining a current conservative anti-collision region of a vehicle;
  acquiring omnidirectional environmental information in a current region in the current conservative anti-collision region;
  predicting a behavior of an obstacle according to the omnidirectional environmental information in the current region, wherein the obstacle is located in the conservative anti-collision region; and
  controlling the vehicle to conduct an anti-collision behavior according a prediction result.

In a possible implementation, in the above-mentioned method according to an embodiment of the present disclosure, the determining a current conservative anti-collision region of a vehicle specifically includes:
  determining the current conservative anti-collision region according to a position of a vehicle body and a current driving direction of the vehicle.

In a possible implementation, in the above-mentioned method according to an embodiment of the present disclosure, the determining the current conservative anti-collision region according to a position of a vehicle body and a current driving direction of the vehicle specifically includes:
  determining a first current conservative anti-collision region around the vehicle according to the position of the vehicle body; and
  determining a second current conservative anti-collision region in front of the vehicle along the current driving direction of the vehicle.

In a possible implementation, in the above-mentioned method according to an embodiment of the present disclosure, the first current conservative anti-collision region is a rectangular region around the vehicle body with an area larger than an area occupied by the vehicle;
  the second conservative anti-collision region is a rectangular region or trapezoidal region with a side length longer than a width of the vehicle body, where the second conservative anti-collision region is along the current driving direction of the vehicle and in front of the vehicle.

In a possible implementation, in the above-mentioned method according to an embodiment of the present disclosure, the acquiring omnidirectional environmental information in a current region in the current conservative anti-collision region specifically includes:
  collecting current omnidirectional environmental information through an omnidirectional milliwave radar and/or a laser radar; and
  capturing the omnidirectional environmental information in the current region in the current conservative anti-collision region.

In a possible implementation, in the above-mentioned method according to an embodiment of the present disclosure, after the acquiring omnidirectional environmental information in a current region in the current conservative anti-collision region, further includes:
  acquiring omnidirectional environmental information out of the current region of a preset region out of the current conservative anti-collision region; and
  predicting, according to the omnidirectional environmental information out of the current region, the behavior of the obstacle that enters the current conservative anti-collision region in a preset period.

In a possible implementation, in the above-mentioned method according to an embodiment of the present disclosure, after the predicting a behavior of an obstacle, further including:
  performing a predictive compensation to the behavior of the obstacle entering the current conservative anti-collision region;
  accordingly, after the controlling the vehicle to conduct an anti-collision behavior according a prediction result, further including:
  controlling the vehicle to conduct a compensation for the anti-collision behavior according to a result of the prediction compensation.

A second aspect of embodiments of the present disclosure provides an apparatus for preventing a vehicle collision, including:
  a determining module, configured to determine a current conservative anti-collision region of a vehicle;

an acquiring module, configured to acquire omnidirectional environmental information in a current region in the current conservative anti-collision region;

a predicting module, configured to predict a behavior of an obstacle according to the omnidirectional environmental information in the current region, wherein the obstacle is located in the conservative anti-collision region; and a controlling module, configured to control the vehicle to conduct an anti-collision behavior according a prediction result.

In a possible implementation, in the above-mentioned apparatus according to an embodiment of the present disclosure, the determining module is specifically configured to determine the current conservative anti-collision region according to a position of a vehicle body and a current driving direction of the vehicle.

In a possible implementation, in the above-mentioned apparatus according to an embodiment of the present disclosure, the determining module includes:

a first determining unit, configured to determine a first current conservative anti-collision region around the vehicle according to the position of the vehicle body; and a second determining unit, configured to determine a second current conservative anti-collision region in front of the vehicle along the current driving direction of the vehicle.

In a possible implementation, in the above-mentioned apparatus according to an embodiment of the present disclosure, the first current conservative anti-collision region is a rectangular region around the vehicle body with an area larger than an area occupied by the vehicle;

the second conservative anti-collision region is a rectangular region or a trapezoidal region with a side length longer than a width of the vehicle body, wherein the second conservative anti-collision region is along the current driving direction of the vehicle and in front of the vehicle.

In a possible implementation, in the above-mentioned apparatus according to an embodiment of the present disclosure, the acquiring module is specifically configured to collect current omnidirectional environmental information through an omnidirectional milliwave radar and/or a laser radar, and capture the omnidirectional environmental information in the current region in the current conservative anti-collision region.

In a possible implementation, in the above-mentioned apparatus according to an embodiment of the present disclosure, the acquiring module is further configured to acquire omnidirectional environmental information out of a current region of a preset region out of the current conservative anti-collision region after acquiring the omnidirectional environmental information in the current region in the current conservative anti-collision region; and the predicting module is further configured to predict, according to the omnidirectional environmental information out of the current region, the behavior of the obstacle that enters the current conservative anti-collision region in a preset period.

In a possible implementation, in the above-mentioned apparatus according to an embodiment of the present disclosure, further includes: a predictive compensating module, configured to perform a predictive compensation to the behavior of the obstacle entering the current conservative anti-collision region;

accordingly, the controlling module is further configured to, after controlling the vehicle to conduct an anti-collision behavior according a prediction result, control the vehicle to conduct a compensation for the anti-collision behavior according to a result of the prediction compensation.

A third aspect of embodiments of the present disclosure provides an electronic device, including: a memory, a processor and a computer program;

where the computer program is stored in the memory, and is configured to be executed by the processor to implement the method according to the first aspect or any implementation thereof.

A fourth aspect of embodiments of the present disclosure provides a computer readable storage medium storing a computer program, the program is executed by a processor to implement the method according to the first aspect or any implementation thereof.

According to the aspects described above, in the embodiments of the present disclosure, by determining a current conservative anti-collision region of a vehicle, acquiring omnidirectional environmental information in a current region in the current conservative anti-collision region, predicting a behavior of an obstacle according to the omnidirectional environmental information in the current region, and controlling the vehicle to conduct an anti-collision behavior according a prediction result, a reasonable prediction may be made to the behavior of the obstacle based on the conservative anti-collision region and the omnidirectional environmental information, thus controlling the vehicle to conduct an accurate anti-collision behavior, thereby preventing collisions effectively, and avoiding an occurrence of traffic accidents.

It should be appreciated that, the content described in the summary section is not intended to limit the key or important features of the implementations of the present disclosure, nor is it intended to limit the scope of the present disclosure. Other features of the present disclosure will be easily understood by the following description.

DESCRIPTION OF EMBODIMENTS

The embodiments of the present disclosure are hereinafter described in detail with reference to the accompanying drawings. Even though the accompanying drawings have shown some embodiments of the present disclosure, it should be appreciated that, the present disclosure could be implemented in variety forms and should not be explained as a limitation to embodiments described herein, instead, these embodiments are used for understanding the present disclosure more thoroughly and completely. It should be appreciated that, accompanying drawings and embodiments of the present disclosure are used for illustrative purposes only and are not intended to limit the scope of the application.

The terms "first", "second", "third", "fourth" and so forth (if present) in the specification and claims of the embodiments of the present disclosure and the above accompanying drawings are used to distinguish similar objects, and are not necessary to describe a particular sequence or precedence order. It is to be understood that the data so used may be interchanged in appropriate situations, so that the embodiments described herein can be implemented, for example, in a sequence other than those illustrated or described herein. In addition, the terms "include" and "have" and any transformation thereof are intended to cover a non-exclusive inclusion, for example, a process, a method, a system, a product or a device that contains a series of steps or units is not necessarily limited to list those steps or units, while they may include other steps or units not explicitly listed or inherent to such processes, methods, products or devices.

Embodiments of the present disclosure will be described in detail below with reference to the accompanying drawings.

Embodiment 1

Figure 1:
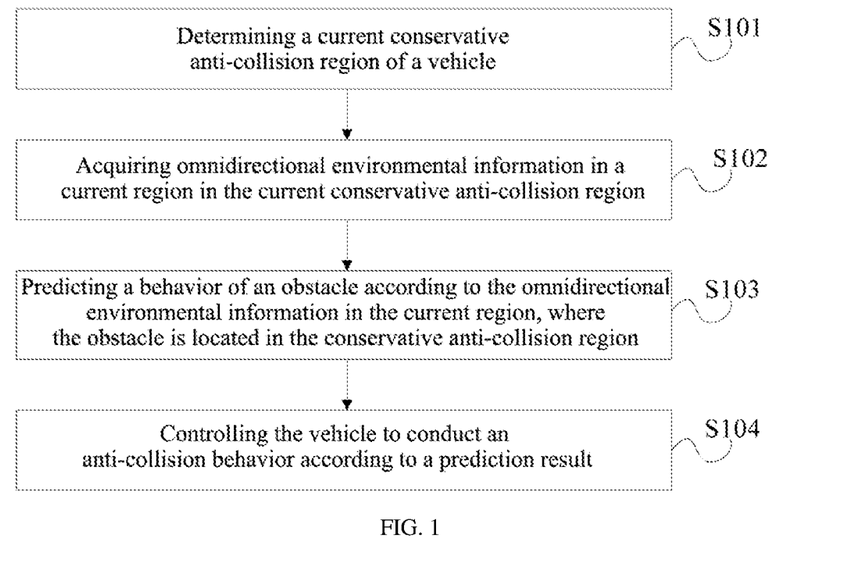
FIG. 1 is a flowchart of a method for preventing a vehicle collision according to Embodiment 1 of the present disclosure.

FIG. 1 is a flowchart of a method for preventing a vehicle collision according to Embodiment 1 of the present disclosure. As shown in FIG. 1, the executive body of the embodiment of the present disclosure is an apparatus for preventing a vehicle collision. In practical applications, the apparatus for preventing the vehicle collision can be implemented by a virtual apparatus, such as software codes, it can also be implemented by a physical apparatus integrated with relative execution codes, such as a U-disk, or it can also be implemented by a physical apparatus integrated with relative execution codes, such as chips, intelligent terminal, autonomous driving systems and so forth. Exemplarily, the following description will take an autonomous driving system as the executive body. The method for preventing a vehicle collision provided in the embodiment of the present disclosure includes the following steps:

S101: determining a current conservative anti-collision region of a vehicle.

Specifically, the conservative anti-collision region in the embodiment can be jointly formed by multiple milliwave radars arranged around a lower part of a vehicle body uniformly, as well as at least one laser radar arranged on a center part of a vehicle roof, so that a surrounding of the vehicle body can be covered comprehensively. The laser radar adopts light detection and a ranging (LIDAR) technology, the at least one laser radar can scan the entire 360-degree horizon more comprehensively and quickly. According to an embodiment of the present disclosure, the current conservative anti-collision region of the vehicle can be determined according to a position of the vehicle body and a current driving direction of the vehicle. According to another embodiment of the present disclosure, the current conservative anti-collision region of the vehicle can also be determined according to current environmental information around the vehicle (such as a width of a lane or a density of obstacles). In practical applications, various methods may be applied to determine the current conservative anti-collision region, which is not limited herein. When any obstacle (such as obstacle vehicles, pedestrians and so forth) shows in the conservative anti-collision region of the vehicle, the autonomous driving system could perform corresponding control to the vehicle immediately, thus avoiding the occurrence of collision or collisions that the vehicle owner has primary responsibilities.

S102: acquiring omnidirectional environmental information in a current region in the current conservative anti-collision region.

Specifically, the omnidirectional environmental information such as information about other vehicle and pedestrian, situations of road surfaces and traffic lights and so forth in the conservative anti-collision region can be acquired through the milliwave radar and LIDAR, in practical applications, various methods may be applied to acquire the omnidirectional environmental information, which is not limited herein. A current region refers to a certain range of regions in which the vehicle is currently located.

S103: predicting a behavior of an obstacle according to the omnidirectional environmental information in the current region, where the obstacle is located in the conservative anti-collision region.

Specifically, the obstacle can be an obstacle within autonomous mobility such as other vehicle or pedestrian, the present autonomous driving system may obtain a prediction result by further predicting the behavior of the obstacle, according to the acquired information such as the driving direction and a speed of the other vehicle and pedestrian and so forth.

For example, when it is detected that another vehicle (a leading vehicle), which is located in the conservative anti-collision region, appears in front of the present vehicle, then the environmental information of the leading vehicle (such as a driving speed, states of turn lamps, a heading road surface, a traffic light and so forth) may be acquired, the autonomous driving system can predict the next action of the leading vehicle, such as parking, turning in advance, changing the lane and so forth according to the environmental information.

S104: controlling the vehicle to conduct an anti-collision behavior according to a prediction result.

Specifically, the autonomous driving system can control the vehicle to conduct a corresponding behavior according to the prediction result of the behavior of the obstacle, so as to prevent a collision or a collision that the vehicle owner has primary responsibilities.

For example, if the prediction result of the next behavior of the leading vehicle is parking, the present vehicle may be controlled to keep a certain distance and a relative speed with respect to the leading vehicle in the current lane according to the driving speed and direction of the leading vehicle, thereby enabling the present vehicle to stop or change its lane to overtake timely, and avoiding the occurrence of a serious accident such as a collision with the leading vehicle and so forth. For another example, when there is some pedestrian walking toward the front of the present vehicle's driving route appears in the conservative anti-collision region in a front side of the vehicle, at this moment, the autonomous driving system can predict whether the next behavior of the pedestrian is speeding through or slowing to avoid according to a speed change of the pedestrian, when the prediction result is slowing to avoid, the present vehicle may be controlled to slow down to pass an intersection of two routes, to save time of both; when the prediction result is that the pedestrian will pre-accelerate to pass, the present vehicle may be controlled to stop to avoid a collision.

According to the method for preventing a vehicle collision provided in this embodiment, by determining a current conservative anti-collision region of a vehicle, acquiring omnidirectional environmental information in a current region in the current conservative anti-collision region, predicting a behavior of an obstacle according to the omnidirectional environmental information in the current region, and controlling the vehicle to conduct an anti-collision behavior according a prediction result, a reasonable prediction may be made to the behavior of the obstacle based on the conservative anti-collision region and the omnidirectional environmental information, thus controlling the vehicle to conduct an accurate anti-collision behavior, thereby preventing collisions effectively, and avoiding an occurrence of traffic accidents.

Embodiment 2

Figure 2:
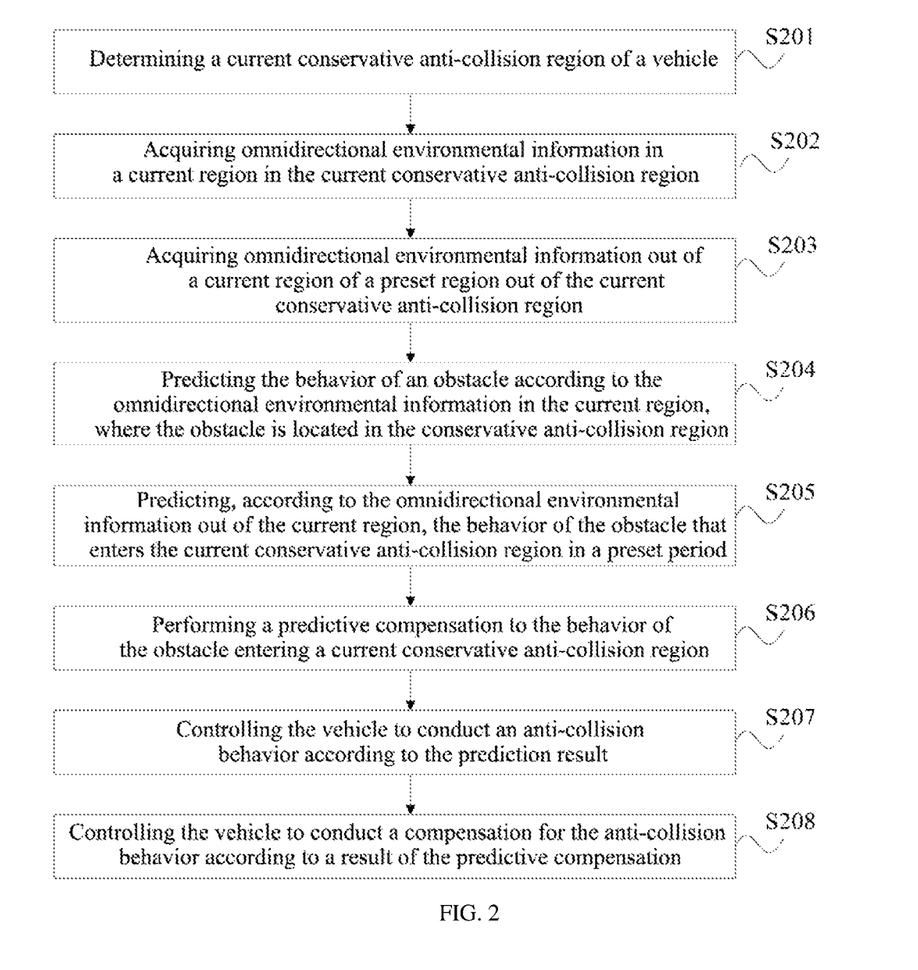
FIG. 2 is a flowchart of method for preventing a vehicle collision according to Embodiment 2 of the present disclosure.

FIG. 2 is a flowchart of method for preventing a vehicle collision according to Embodiment 2 of the present disclosure. As shown in FIG. 2, the method for preventing a vehicle collision provided in this embodiment includes the following steps:

S201: determining a current conservative anti-collision region of a vehicle.

Specifically, the conservative anti-collision region in the embodiment can be jointly formed by multiple milliwave radars arranged around a lower part of a vehicle body uniformly, as well as at least one laser radar arranged on a center part of the vehicle roof, so that a surrounding of the vehicle body can be covered comprehensively. The at least one laser radar can scan the entire 360-degree horizon more comprehensively and quickly. The laser radar adopts light detection and a ranging (LIDAR) technology. When any obstacle (such as obstacle vehicles, pedestrians and so forth) shows in the conservative anti-collision region of the vehicle, the autonomous driving system could perform corresponding control to the vehicle immediately, thus avoiding the occurrence of collision or collisions that the vehicle owner has primary responsibilities.

In an implementation, the step S201 specifically includes:

S2011: determining the current conservative anti-collision region of the vehicle according to a position of a vehicle body and a current driving direction of the vehicle.

Specifically, various methods may be applied for setting the conservative anti-collision region, in practical applications, it may be determined according to the current position of the vehicle body and the current driving direction of the vehicle.

In an implementation, the step S2011 specifically includes:

S2011a: determining a first current conservative anti-collision region around the vehicle according to the position of the vehicle body.

Figure 3:
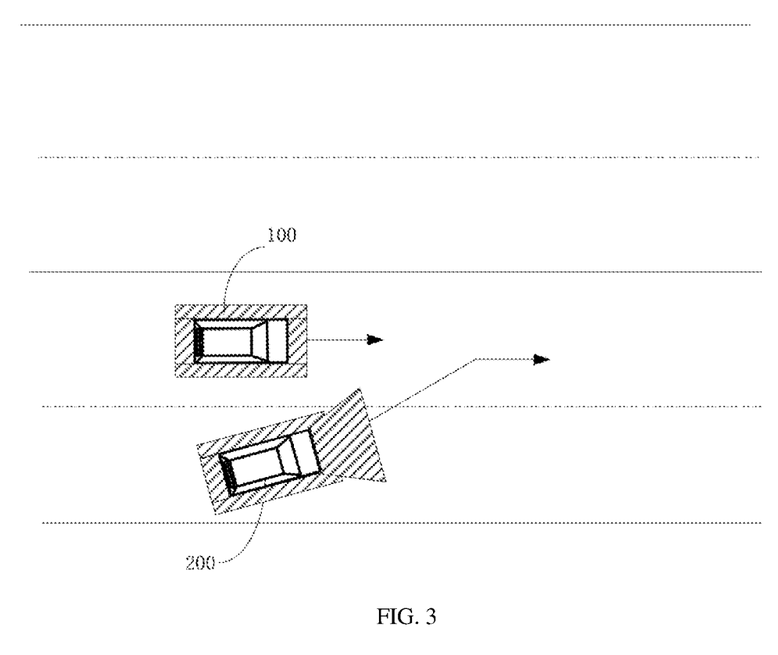
FIG. 3 is a schematic diagram of a conservative anti-collision region according to Embodiment 2 of the present disclosure.

Preferably, the first current conservative anti-collision region is a rectangular region around the vehicle body with an area larger than an area occupied by the vehicle, as the rectangular region around the body of the vehicle 100 shown in FIG. 3.

S2011b: determining a second current conservative anti-collision region in front of the vehicle along the current driving direction of the vehicle.

Preferably, the second conservative anti-collision region is a rectangular region or a trapezoidal region with a side length longer than a width of the vehicle body, where the second conservative anti-collision region is along the current driving direction of the vehicle and in front of the vehicle.

For example, when the vehicle is in a state of direct moving, the second conservative anti-collision region may be a rectangular, as the vehicle 100 shown in FIG. 3. When the vehicle is in a state of making a turn, the second conservative anti-collision region may be a trapezoidal region, to increase the area of the conservative anti-collision region, cover the blind turning area to the maximum extent, and avoid the occurrence of collisions, as the trapezoidal region of the cab of the vehicle 200 shown in FIG. 3.

S202: acquiring omnidirectional environmental information in a current region in the current conservative anti-collision region.

In an implementation, the step S202 specifically includes:

S2021: collecting current omnidirectional environmental information of the vehicle through an omnidirectional milliwave radar and/or a laser radar;

S2022: capturing the omnidirectional environmental information in the current region in the current conservative anti-collision region.

Specifically, the omnidirectional environmental information such as information about other vehicle and pedestrian, situations of road surfaces and traffic lights and so forth in the current conservative anti-collision region can be acquired through the milliwave radar and LIDAR. The current region refers to a certain range of regions in which the vehicle is currently located.

S203: acquiring omnidirectional environmental information out of a current region of a preset region out of the current conservative anti-collision region.

Specifically, the omnidirectional environmental information in the current region in the current conservative anti-collision region can be acquired, as well as the omnidirectional environmental information out of the current region of the preset region out of the current conservative anti-collision region, the preset region may be a region that the autonomous driving system mostly focuses, such as both right and left sides of the crossroad. The omnidirectional environmental information such as information about other vehicle and pedestrian, conditions of road surfaces and traffic lights, and so forth can be acquired through the milliwave radar and LIDAR.

S204: predicting a behavior of an obstacle according to the omnidirectional environmental information in the current region, where the obstacle is located in the conservative anti-collision region.

Specifically, the detail content of this step is as same as the step S301 in Embodiment 1, which will not be repeated herein again.

S205: predicting, according to the omnidirectional environmental information out of the current region, the behavior of the obstacle that enters the current conservative anti-collision region in a preset period.

Specifically, the obstacle (such as other vehicle and pedestrian) out of the current region may enter the current conservative anti-collision region in a short period, there may be a collision risk, thus attention should be paid to the obstacle that enters the current conservative anti-collision region in the preset period (such as 1 second) and the next behavior of the obstacle may be predicted.

S206: performing a predictive compensation to the behavior of the obstacle entering the current conservative anti-collision region.

Specifically, to perform an optimistic driving strategy, the predictive compensation for the behavior of the obstacle may be performed, that is, performing the predictive compensation according to the change of the behavior of the obstacle, when the obstacle changes from a low speed to a high speed, it can be predicted that the collision may happen when the obstacle enters the current conservative anti-collision region at the next moment from a region out of the current conservative anti-collision region, then the predictive compensation for this behavior of the obstacle may be performed, that is, a prediction to an emergency situation.

S207: controlling the vehicle to conduct an anti-collision behavior according to the prediction result.

Specifically, the autonomous driving system can control a vehicle to conduct a corresponding behavior to prevent a collision or collisions that the vehicle owner has primary responsibilities, according to the prediction result of the behavior of the obstacle.

For example, if the prediction result of the next behavior of the leading vehicle is parking, the present vehicle may be controlled to keep a certain distance and a relative speed with respect to the leading vehicle in the current lane according to the driving speed and direction of the leading vehicle, thereby enabling the present vehicle to stop or change its lane to overtake timely, and avoiding the occurrence of a serious accident such as a collision with the leading vehicle and so forth. For another example, when there is some pedestrian walking toward the front of the present vehicle's driving route appears in the conservative anti-collision region in a front side of the vehicle, at this moment, the autonomous driving system can predict whether the next behavior of the pedestrian is speeding through or slowing to avoid according to a speed change of the pedestrian, when the prediction result is slowing to avoid, the present vehicle may be controlled to slow down to pass an intersection of the two routes; when the prediction result is that the pedestrian will pre-accelerate to pass, the present vehicle may be controlled to stop to avoid a collision.

S208: controlling the vehicle to conduct a compensation for the anti-collision behavior according to a result of the predictive compensation.

Specifically, the result of the predictive compensation regarding the behavior of the obstacle entering the current conservative anti-collision region may be a repeat speed slowing based on the anti-collision behavior in step S207, it may also be a direct stop to avoid, thereby avoiding the occurrence of the collision.

According to the method for preventing a vehicle collision provided in this embodiment, by determining a current conservative anti-collision region of a vehicle, acquiring omnidirectional environmental information in a current region in the current conservative anti-collision region and omnidirectional environmental information out of a current region of a preset region out of the current conservative anti-collision region, predicting a behavior of an obstacle according to the omnidirectional environmental information in the current region, and predicting the behavior of the obstacle that enters the current conservative anti-collision region in a preset period according to the omnidirectional environmental information out of the current region, performing a predictive compensation to the behavior of the obstacle entering the current conservative anti-collision region, and controlling the vehicle to conduct an anti-collision behavior according a prediction result, controlling the vehicle to conduct a compensation for the anti-collision behavior according to a result of the prediction compensation, a reasonable prediction may be made to the behavior of the obstacle based on the conservative anti-collision region, the omnidirectional environmental information in the current area and the omnidirectional environmental information out of the current area, thus controlling the vehicle to conduct an accurate anti-collision behavior, thereby preventing collisions effectively, and avoiding an occurrence of traffic accidents.

Embodiment 3

Figure 4:
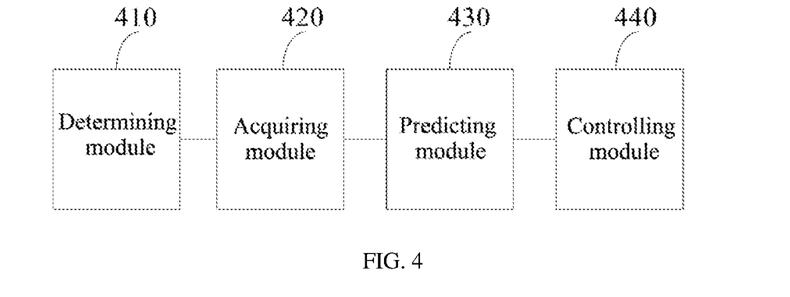
FIG. 4 is a schematic structural diagram of an apparatus for preventing a vehicle collision according to Embodiment 3 of the present disclosure.

FIG. 4 is a schematic structural diagram of an apparatus for preventing a vehicle collision according to Embodiment 3 of the present disclosure. As shown in FIG. 4, the apparatus provided in this embodiment includes: a determining module 410, an acquiring module 420, a predicting module 430 and a controlling module 440.

A determining module 410, configured to determine a current conservative anti-collision region of a vehicle.

Specifically, the conservative anti-collision region in the embodiment can be jointly formed by multiple milliwave radars arranged around a lower part of a vehicle body uniformly, as well as at least one laser radar arranged on a center part of a vehicle roof, so that a surrounding of the vehicle body can be covered comprehensively. The determining module 410 is configured to determine the current conservative anti-collision region according to a position of a vehicle body and a current driving direction of the vehicle, the determining module 410 is further configured to determine the current conservative anti-collision region of the vehicle according to environmental information around the vehicle body (such as a width of a lane or a density of obstacles). In practical applications, various methods may be applied by the determining module 410 for determining the current conservative anti-collision region, which is not limited herein.

The acquiring module 420 is configured to acquire the omnidirectional environmental information in the current region in the current conservative anti-collision region.

Specifically, the omnidirectional environmental information such as information about other vehicle and pedestrian, situations of road surface and traffic light in the conservative anti-collision region can be acquired through the milliwave radar and LIDAR. The current region refers to a certain range of regions in which the vehicle is currently located.

The predicting module 430 is configured to predict a behavior of an obstacle according to the omnidirectional environmental information in the current region, the obstacle is located in the conservative anti-collision region.

Specifically, the obstacle can be an obstacle within autonomous mobility such as other vehicle or pedestrian, the present autonomous driving system may obtain a prediction result by further predicting the behavior of the obstacle, according to the acquired information such as the driving directions and a speed of the other vehicle and pedestrian and so forth.

The controlling module 440 is configured to control the vehicle to conduct an anti-collision behavior according to a prediction result.

Specifically, the controlling module 440 can control the vehicle to conduct a corresponding behavior according to the prediction result of the behavior of the obstacle, so as to prevent a collision or a collision that the vehicle owner has primary responsibilities.

According to an implementation of the present disclosure, in the apparatus described above in embodiments of the present disclosure:

the determining module 410 is specifically configured to determine the current conservative anti-collision region of the vehicle according to a position of a vehicle body and a current driving direction of the vehicle.

Specifically, various method may be applied for setting the conservative anti-collision region, and in practical applications, the determining module 410 can determine the conservative anti-collision region according to the current position of the vehicle body and the current driving direction of the vehicle.

According to an implementation of the present disclosure, in the apparatus described above provided in embodiments of the present disclosure, the determining module 410, may include the following units:

a first determining unit 411, configured to determine a first current conservative anti-collision region around the vehicle according to the position of the vehicle body; and a second determining unit 412, configured to determine a second current conservative anti-collision region in front of the vehicle along the current driving direction of the vehicle.

According to an implementation of the present disclosure, in the apparatus described above provided in embodiments of the present disclosure, the first current conservative anti-collision region is a rectangular region around the vehicle body with an area larger than an area occupied by the vehicle.

The second conservative anti-collision region is a rectangular region or trapezoidal region with a side length longer than a width of the vehicle body, where the second conservative anti-collision region is along the current driving direction of the vehicle and in front of the vehicle.

According to an implementation of the present disclosure, in the apparatus described above provided in embodiments of the present disclosure:

the acquiring module 420 is specifically configured to collect current omnidirectional environmental information of the vehicle through an omnidirectional milliwave radar and/or a laser radar, and capture the omnidirectional environmental information in the current region in the current conservative anti-collision region.

Reference may be made to steps in FIG. 1 for relevant descriptions and effects, which will not be repeated herein again.

According to the apparatus for preventing a vehicle collision provided in this embodiment, by determining a current conservative anti-collision region of a vehicle, acquiring omnidirectional environmental information in a current region in the current conservative anti-collision region, predicting a behavior of an obstacle according to the omnidirectional environmental information in the current region, and controlling the vehicle to conduct an anti-collision behavior according a prediction result, a reasonable prediction may be made to the behavior of the obstacle based on the conservative anti-collision region and the omnidirectional environmental information, thus controlling the vehicle to conduct an accurate anti-collision behavior, thereby preventing collisions effectively, and avoiding an occurrence of traffic accidents.

Embodiment 4

Figure 5:
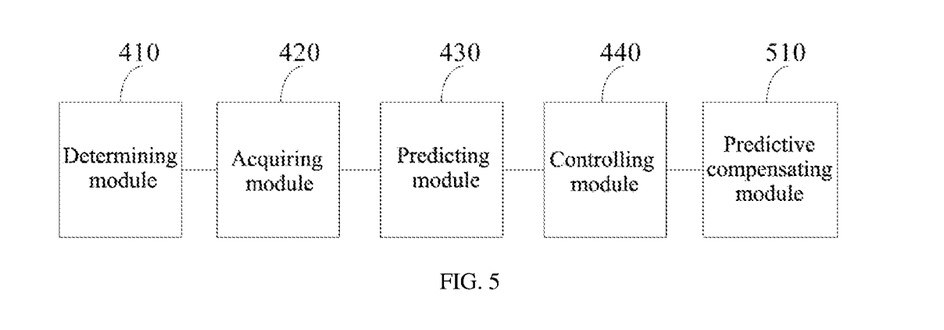
FIG. 5 is a schematic structural diagram of an apparatus for preventing a vehicle collision according to Embodiment 4 of the present disclosure.

FIG. 5 is a schematic structural diagram of an apparatus for preventing a vehicle collision according to Embodiment 4 of the present disclosure. As shown in FIG. 5, on the basis of Embodiment 3, in an apparatus provided in this embodiment:

the acquiring module 420 is further configured to acquire omnidirectional environmental information out of a current region of a preset region out of the current conservative anti-collision region after acquiring the omnidirectional environmental information in the current region in the current conservative anti-collision region.

Specifically, the acquiring module 420 can not only acquire the omnidirectional environmental information in the current region in the current conservative anti-collision region, but can also acquire the omnidirectional environmental information out of the current region of the preset region out of the current conservative anti-collision region, the preset region may be a region that the autonomous driving system mostly focuses, such as both right and left sides of the crossroad. The omnidirectional environmental information such as information about other vehicle and pedestrian, conditions of road surfaces and traffic lights, and so forth can be acquired through the milliwave radar and LIDAR.

The predicting module 430 is further configured to predict, according to the omnidirectional environmental information out of the current region, the behavior of the obstacle that enters the current conservative anti-collision region in a preset period.

Specifically, the obstacle (such as other vehicle and pedestrian) out of the current region may enter the current conservative anti-collision region in a short period, there may be a collision risk, thus attention should be paid to the obstacle that enters the current conservative anti-collision region in the preset period (such as 1 second) and the next behavior of the obstacle may be predicted.

According to an implementation of the present disclosure, in the apparatus described above provided in the embodiment of the present disclosure, it may further includes: a predictive compensating module 510 configured to perform a predictive compensation to the behavior of the obstacle entering the current conservative anti-collision region, after the predicting module 430 predicts the behavior of the obstacle.

Specifically, to perform an optimistic driving strategy, the predictive compensation for the behavior of the obstacle may be performed, that is, performing the predictive compensation according to the change of the behavior of the obstacle, when the obstacle changes from a low speed to a high speed, it can be predicted that the collision may happen when the obstacle enters the current conservative anti-collision region at the next moment from a region out of the current conservative anti-collision region, then the predictive compensation for this behavior of the obstacle may be performed, that is, a prediction to an emergency situation.

Accordingly, the controlling module 440 is further configured to, after controlling the vehicle to conduct an anti-collision behavior according a prediction result, control the vehicle to conduct a compensation for the anti-collision behavior according to a result of the prediction compensation.

According to the apparatus for preventing a vehicle collision provided in this embodiment, by determining a current conservative anti-collision region of a vehicle, acquiring omnidirectional environmental information in a current region in the current conservative anti-collision region and omnidirectional environmental information out of a current region of a preset region out of the current conservative anti-collision region, predicting a behavior of an obstacle according to the omnidirectional environmental information in the current region, and predicting the behavior of the obstacle that enters the current conservative anti-collision region in a preset period according to the omnidirectional environmental information out of the current region, performing a predictive compensation to the behavior of the obstacle entering the current conservative anti-collision region, and controlling the vehicle to conduct an anti-collision behavior according a prediction result, controlling the vehicle to conduct a compensation for the anti-collision behavior according to a result of the prediction compensation, a reasonable prediction may be made to the behavior of the obstacle based on the conservative anti-collision region, the omnidirectional environmental information in the current area and the omnidirectional environmental information out of the current area, thus controlling the vehicle to conduct an accurate anti-collision behavior, thereby preventing collisions effectively, and avoiding an occurrence of traffic accidents.

Embodiment 5

Figure 6:
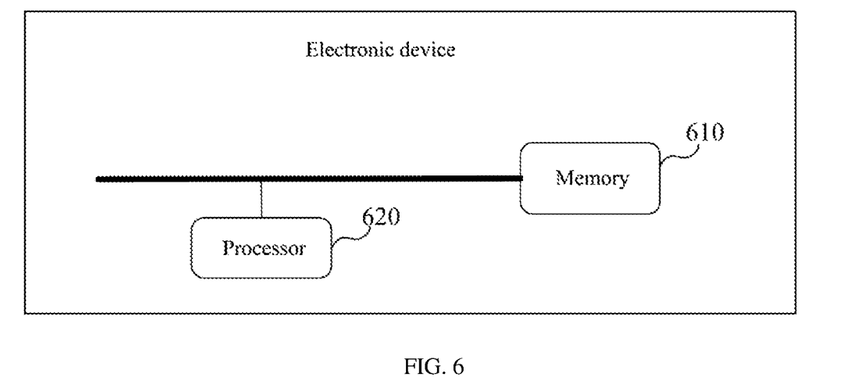
FIG. 6 is a schematic structural diagram of an electronic device according to Embodiment 5 of the present disclosure.

FIG. 6 is a schematic structural diagram of an electronic device according to Embodiment 5 of the present disclosure. As shown in FIG. 6, this electronic device includes: a memory 610, a processor 620 and a computer program.

Where the computer program is stored in the memory 610, and is configured to be executed by the processor 620 to implement the method for preventing a vehicle collision provided in Embodiment 1 and Embodiment 2 of the present disclosure.

Reference may be made to steps in FIGS. 1 and 2 for relevant descriptions and effects, which will not be repeated herein again.

In this embodiment, the processor may be a central processing unit (CPU), or other kind of processing units that have data processing abilities and/or instruction execution abilities, and may control other units in the electronic device to implement desired functions.

The memory may include one or more computer programming products, the computer programming product may include variety forms of computer readable storage mediums, such as a volatile memory and/or a non-volatile memory. The volatile memory may include, for example, a random access memory (RAM) and/or a high-speed buffer memory (cache), etc. The non-volatile memory may include a read-only memory (ROM), a hard disk, a flash memory, etc. One or more computer program instructions may be stored on the computer readable storage medium, and the processor may run the program instructions to implement the method for preventing a vehicle collision according to embodiments of the present disclosure described above and/or other desired functions. In the computer readable storage medium, various contents such as an input signal, a signal component and a noise component can also be stored.

Embodiment 6

The embodiment 6 of the present disclosure provides a computer readable storage medium, which stores a computer program, the computer program is executed by a processor to implement the method for preventing a vehicle collision in Embodiment 1 or Embodiment 2 of the present disclosure.

A person skilled in the art can clearly understand that for the convenience and brevity of the description, reference may be made to corresponding processes in the foregoing method embodiments for the specific working process of the device described above, which will not be repeated herein again.

In the embodiments of the present disclosure, it should be appreciated that, the disclosed apparatus and method can be implemented in other forms. For example, the apparatus embodiment described above is merely illustrative, for instance, the partition of modules is merely a partition in terms of logical functions, when implemented in practice other partition methods may be applied, for example, multiple modules and units may be combined or integrated into another system, or some features of which may be ignored or unexecuted. On the other hand, the displayed or discussed coupling to each other, or direct coupling or communicative connections may be indirect coupling or communicative connections through some modules, ports or apparatus, and may be electrical, mechanical or in other forms.

The modules explained as separate parts may be or may not be physically separated, the components displayed as modules may be or may not be physical modules, they may be located in one place or distributed in multiple network modules. Some or all of the modules may be selected according to actual needs to implement the purposes of the solutions of the embodiments.

Furthermore, the functional modules in the embodiments of the present disclosure may be integrated into one processing module, or may exist as individual modules, or two or more than two modules may be integrated into one module. The integrated module described above may be implemented in the form of hardware or in the form of a combination of hardware and software functional modules.

The program codes used for implementing the method of the present disclosure may be programmed with any combination of one or more programming languages. These program codes may be provided to a general purpose computer, a special purpose computer or other processors or controllers of programmable data processing apparatus, so that the program codes, when executed by processors or controllers, enable the implementation of functions/operations specified in flowcharts/diagrams. The program codes may be entirely or partly implemented on a machine, or as a separate software packet, may also be partly executed on a machine and partly executed on a remote machine, or may be entirely executed on a remote machine or a server.

In the context of the present disclosure, the machine readable medium may be a physical medium, which may include or store programs to be used by an instruction execution system, apparatus or device, or to be used in combination with an instruction execution system, apparatus or device. The machine readable medium may be a machine readable signal medium or a machine readable storage medium. The machine readable medium may include, but is not limited to, electronic, magnetic, optical, electromagnetic, infrared, or semiconductor systems, apparatus or devices, or any suitable combination of the above. More specific examples of machine readable storage medium will include an electrical connection based on one or more wires, a portable computer disk, a hard disk, a random access memory (RAM), a read-only memory (ROM), an erasable programmable read-only memory (EPROM or Flash memory), an optical fiber, a compact disk read-only memory (CD-ROM), an optical storage device, a magnetic storage device, or any suitable combination of the above.

Besides, although operations are depicted in a specific order, this should be understood as such operations being required to be performed in a specified order or in a subsequent order as shown, or all illustrated operations being required to be performed to achieve desired results. Under certain circumstances, multitasking and parallel processing may be advantageous. Similarly, although a number of specific implementation details are included in the above discussion, these should not be construed as restrictions on the scope of the present disclosure. Some features described in the context of individual embodiments may also be implemented in combination in a single implementation. Conversely, the various features described in the context of a single implementation can also be implemented in multiple implementations individually or in any suitable combination of sub-implementations.

Although the subject has been described in language specific to structural features and/or method logical actions, it should be understood that the subject defined in the appended claims is not necessarily limited to the specific features or actions described above. On the contrary, the specific features and actions described above are only examples of the implementation of claims.

What is claimed is:

1. A method for preventing a vehicle collision, comprising:
    determining a current conservative anti-collision region of a vehicle;
    acquiring omnidirectional environmental information in a current region in the current conservative anti-collision region;
    predicting a behavior of an obstacle according to the omnidirectional environmental information in the current region, wherein the obstacle is located in the conservative anti-collision region; and
    controlling the vehicle to conduct an anti-collision behavior according to a prediction result;
    wherein after the acquiring omnidirectional environmental information in a current region in the current conservative anti-collision region, the method further comprises:
    acquiring omnidirectional environmental information out of the current region of a preset region out of the current conservative anti-collision region; and
    predicting, according to the omnidirectional environmental information out of the current region, a behavior of an obstacle entering the current conservative anti-collision region in a preset period.

2. The method according to claim 1, wherein the determining a current conservative anti-collision region of a vehicle comprises:
    determining the current conservative anti-collision region according to a position of a vehicle body and a current driving direction of the vehicle.

3. The method according to claim 2, wherein the determining the current conservative anti-collision region according to a position of a vehicle body and a current driving direction of the vehicle comprises:
    determining a first current conservative anti-collision region around the vehicle according to the position of the vehicle body; and
    determining a second current conservative anti-collision region in front of the vehicle along the current driving direction of the vehicle;
    wherein the current conservative anti-collision region comprises the first current conservation anti-collision region and the second current conservative anti-collision region.

4. The method according to claim 3, wherein the first current conservative anti-collision region is a rectangular region around the vehicle body with an area larger than an area occupied by the vehicle;
    the second current conservative anti-collision region is a rectangular region or a trapezoidal region with a side length longer than a width of the vehicle body, wherein the second current conservative anti-collision region is along the current driving direction of the vehicle and in front of the vehicle.

5. The method according to claim 1, wherein the acquiring omnidirectional environmental information in a current region in the current conservative anti-collision region comprises:
    collecting current omnidirectional environmental information through at least one of an omnidirectional milliwave radar or a laser radar; and
    capturing the omnidirectional environmental information in the current region in the current conservative anti-collision region.

6. The method according to claim 1, wherein after the predicting a behavior of an obstacle, further comprising:
    performing a predictive compensation to the behavior of the obstacle entering the current conservative anti-collision region;
    accordingly, after the controlling the vehicle to conduct an anti-collision behavior according to a prediction result, further comprising:
    controlling the vehicle to conduct a compensation for the anti-collision behavior according to a result of the prediction compensation.

7. An apparatus for preventing a vehicle collision, comprising:
    a memory, a processor and a computer program;
    wherein the computer program is stored in the memory, and is configured to be executed by the processor to cause the processor to:
    determine a current conservative anti-collision region of a vehicle;
    acquire omnidirectional environmental information in a current region in the current conservative anti-collision region;
    predict a behavior of an obstacle according to the omnidirectional environmental information in the current region, wherein the obstacle is located in the conservative anti-collision region; and
    control the vehicle to conduct an anti-collision behavior according to a prediction result;
    wherein the computer program further causes the processor to acquire omnidirectional environmental information out of the current region of a preset region out of the current conservative anti-collision region after acquiring the omnidirectional environmental information in the current region in the current conservative anti-collision region; and
    predict, according to the omnidirectional environmental information out of the current region, a behavior of an obstacle entering the current conservative anti-collision region in a preset period.

8. The apparatus according to claim 7, wherein the computer program further causes the processor to determine the current conservative anti-collision region according to a position of a vehicle body and a current driving direction of the vehicle.

9. The apparatus according to claim 8, wherein the computer program further causes the processor to:
    determine a first current conservative anti-collision region around the vehicle according to the position of the vehicle body; and
    determine a second current conservative anti-collision region in front of the vehicle along the current driving direction of the vehicle;

wherein the current conservative anti-collision region comprises the first current conservation anti-collision region and the second current conservative anti-collision region.

10. The apparatus according to claim 9, wherein the first current conservative anti-collision region is a rectangular region around the vehicle body with an area larger than an area occupied by the vehicle;

the second current conservative anti-collision region is a rectangular region or a trapezoidal region with a side length longer than a width of the vehicle body, wherein the second current conservative anti-collision region is along the current driving direction of the vehicle and in front of the vehicle.

11. The apparatus according to claim 7, wherein the computer program further causes the processor to collect current omnidirectional environmental information through at least one of an omnidirectional milliwave radar or a laser radar, and capture the omnidirectional environmental information in the current region in the current conservative anti-collision region.

12. The apparatus according to claim 7, wherein the computer program further causes the processor to perform a predictive compensation to the behavior of the obstacle entering the current conservative anti-collision region;

accordingly, the computer program further causes the processor to, after controlling the vehicle to conduct an anti-collision behavior according to a prediction result, control the vehicle to conduct a compensation for the anti-collision behavior according to a result of the prediction compensation.

13. A computer readable storage medium storing a computer program, wherein the computer program is executed by a processor to implement the method according to claim 1.

* * * * *